(12) United States Patent
Jewess et al.

(10) Patent No.: US 9,803,498 B2
(45) Date of Patent: Oct. 31, 2017

(54) ONE-PIECE FUEL NOZZLE FOR A THRUST ENGINE

(71) Applicants: Gordon F. Jewess, San Diego, CA (US); Patrick M. Lydon, San Marcos, CA (US); Robert O. Barkley, San Diego, CA (US); Eric J. Alexander, San Diego, CA (US); Davis Bunone, San Diego, CA (US)

(72) Inventors: Gordon F. Jewess, San Diego, CA (US); Patrick M. Lydon, San Marcos, CA (US); Robert O. Barkley, San Diego, CA (US); Eric J. Alexander, San Diego, CA (US); Davis Bunone, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 848 days.

(21) Appl. No.: 13/653,475

(22) Filed: Oct. 17, 2012

(65) Prior Publication Data

US 2014/0102112 A1 Apr. 17, 2014

(51) Int. Cl.
| | |
|---|---|
| *F23R 3/28* | (2006.01) |
| *F02C 7/22* | (2006.01) |
| *F02C 7/228* | (2006.01) |
| *F01D 15/10* | (2006.01) |
| *F02C 3/14* | (2006.01) |
| *F23R 3/34* | (2006.01) |

(52) U.S. Cl.
CPC .............. *F01D 15/10* (2013.01); *F02C 3/145* (2013.01); *F02C 7/22* (2013.01); *F02C 7/222* (2013.01); *F02C 7/228* (2013.01); *F23R 3/28* (2013.01); *F23R 3/283* (2013.01); *F23R 3/286* (2013.01); *F05D 2220/768* (2013.01); *F05D 2250/82* (2013.01); *F23C 2900/03001* (2013.01); *F23R 3/34* (2013.01)

(58) Field of Classification Search
CPC .... F23R 3/286; F23R 3/34; F23R 3/28; F23R 3/283; F02C 7/22; F02C 7/222; F02C 7/228
See application file for complete search history.

(56) References Cited

U.S. PATENT DOCUMENTS

| | | | |
|---|---|---|---|
| 2,970,438 A * | 2/1961 | Howald | .................. F02C 7/222 60/739 |
| 4,028,888 A | 6/1977 | Pilarczyk | |
| 4,891,936 A * | 1/1990 | Shekleton | ................. F23R 3/28 60/746 |

(Continued)

OTHER PUBLICATIONS

International Search Report for Pct Application No. PCT/US2013/064488 dated Aug. 26, 2014.

(Continued)

*Primary Examiner* — Gerald L Sung
*Assistant Examiner* — Scott Walthour
(74) *Attorney, Agent, or Firm* — Carlson, Gaskey & Olds, P.C.

(57) ABSTRACT

A nozzle formed of one piece for a jet engine includes a mixing tube, a fuel conduit integrally formed with the mixing tube, and an opening through the fuel conduit and directed radially into the mixing tube.

21 Claims, 6 Drawing Sheets

(56) References Cited

U.S. PATENT DOCUMENTS

| | | | |
|---|---|---|---|
| 5,197,288 A * | 3/1993 | Newland | F02C 7/222 |
| | | | 60/734 |
| 5,437,159 A | 8/1995 | Ansart et al. | |
| 6,112,511 A | 9/2000 | Myers | |
| 6,141,968 A | 11/2000 | Gates et al. | |
| 6,279,323 B1 | 8/2001 | Monty et al. | |
| 6,955,053 B1 | 10/2005 | Chen et al. | |
| 7,475,549 B2 | 1/2009 | Alexander et al. | |
| 8,215,115 B2 | 7/2012 | Adair et al. | |
| 2009/0255264 A1 * | 10/2009 | McMasters | F02K 9/52 |
| | | | 60/747 |
| 2010/0071663 A1 * | 3/2010 | Patel | F02C 7/222 |
| | | | 123/456 |
| 2010/0174466 A1 * | 7/2010 | Davis, Jr. | F02C 7/22 |
| | | | 701/100 |
| 2010/0229557 A1 * | 9/2010 | Matsumoto | F23R 3/346 |
| | | | 60/737 |
| 2011/0154824 A1 * | 6/2011 | Fiebig | F02C 7/222 |
| | | | 60/739 |
| 2012/0102958 A1 | 5/2012 | Stoia et al. | |

OTHER PUBLICATIONS

International Preliminary Report on Patentability for PCT/US2013/064488 dated Apr. 30, 2015.

\* cited by examiner

ONE-PIECE FUEL NOZZLE FOR A THRUST ENGINE

BACKGROUND

The present invention relates to a gas turbine engine and, more particularly, to a nozzle for a miniature gas turbine engine.

Miniature gas turbine or turbojet engines (typically of 150 lbf thrust and smaller) are often utilized in single usage applications such as reconnaissance drones, cruise missiles, decoy and other weapon applications, including air-launched and ground-launched weapon systems. The use of such an engine greatly extends the range of the weapon in comparison to the more conventional solid fuel rocket engine.

To achieve economically feasible extended range expendable propulsion sources for such applications, it is necessary that the miniature gas turbine engines be manufactured relatively inexpensively yet provide the highest degree of starting and operational reliability when launched from air or ground systems.

SUMMARY

According to a non-limiting embodiment disclosed herein, a nozzle formed of one piece for a jet engine includes a mixing tube, a fuel conduit integrally formed with the mixing tube, and an opening through the fuel conduit and directed radially into the mixing tube.

According to any embodiment disclosed hereinabove, the nozzle also includes a plate integrally formed with the mixing tube.

According to any embodiment disclosed hereinabove, the plate has a circular shape that conforms to a shape of an annulus.

According to any embodiment disclosed hereinabove, the fuel conduit is placed on a forward edge of the mixing tube.

According to any embodiment disclosed hereinabove, the mixing tube has an annular wall that is disposed partially on an aft side of the nozzle and extends to the fuel conduit on a first end thereof.

According to any embodiment disclosed hereinabove, the mixing tube has an annular wall that is disposed on an aft side of the nozzle and a slot is created between the fuel conduit and a second end thereof.

According to any embodiment disclosed hereinabove, wherein the mixing tube has an annular wall that is disposed partially on an aft side of the nozzle and extends to the fuel conduit on a first end thereof and a slot is created between the fuel conduit and a second end thereof.

According to any embodiment disclosed hereinabove, the annular wall extends radially outwardly above the fuel conduit.

According to any embodiment disclosed hereinabove, a passageway is formed through an outer wall of the fuel conduit and aligned with the opening such that the passageway and the opening may be formed in one operation, the passageway being sealed after formation of the opening.

According to a further non-limiting embodiment disclosed herein, a nozzle assembly for a jet engine includes a combustor housing, a mixing tube, a fuel conduit integrally formed with the mixing tube, and an opening through the fuel conduit and directed radially into the mixing tube wherein the mixing tube is disposed in the combustor housing.

According to any embodiment disclosed hereinabove, a plate is integrally formed with the mixing tube.

According to any embodiment disclosed hereinabove, the plate has a circular shape that conforms to the shape of the combustor housing.

According to any embodiment disclosed hereinabove, the combustor housing has a first annular row of dilution holes.

According to any embodiment disclosed hereinabove, the fuel conduit integrally formed with the mixing tube replaces every other dilution hole in an annular row of dilution holes.

According to any embodiment disclosed hereinabove, each of the mixing tubes is integrally formed with a plate that is placed in an aperture with a shape complementary to a shape of the plate in the combustor housing.

According to any embodiment disclosed hereinabove, a fuel line connects each fuel conduit to an adjacent fuel conduit wherein the fuel line has a shape that goes around an adjacent dilution hole, the fuel line extending less than a diameter of the fuel line away from an outer surface of the combustor housing.

According to any embodiment disclosed hereinabove, the fuel line is flexible.

According to a non-limiting embodiment disclosed herein, a method of optimizing fuel flow to a combustion chamber includes: obtaining a nozzle made of one-piece, the nozzle having a mixing tube, a fuel conduit integrally formed with the mixing tube, an opening through the fuel conduit and directed radially into the mixing tube, a plate formed integrally with the mixing tube and the fuel conduit; and inserting the nozzle into a dilution hole in a combustor housing.

According to any embodiment disclosed hereinabove, the method further includes the step of attaching the plate in a complementary aperture in the combustor housing.

According to any embodiment disclosed hereinabove, the method further includes the step of canting the mixing tube at an oblique angle relative to the plate such that the nozzle supports circumferential combustion in the combustion housing.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
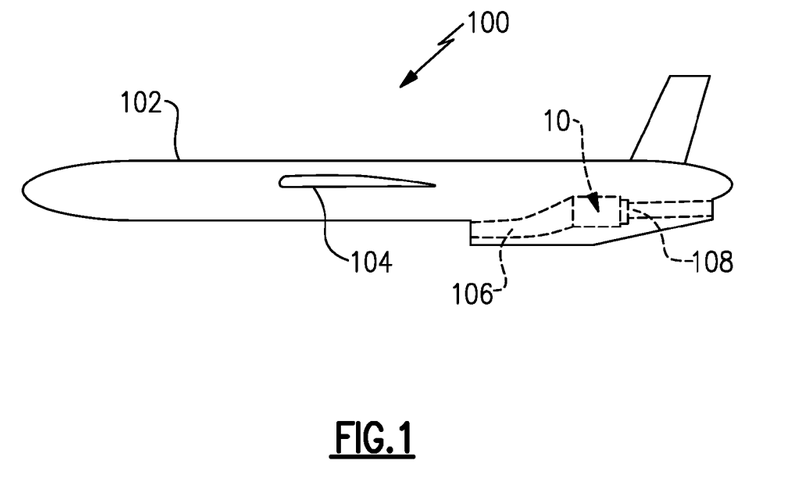
FIG. 1 is a general perspective view of an exemplary vehicle encompassing a non-limiting embodiment described herein.

FIG. 1 illustrates a general schematic view of a vehicle 100 including a miniature gas turbine engine 10 according to the present invention. The vehicle 100 includes a body 102 and one or more aerodynamic surfaces 104. The engine 10 is coupled to, or within, the body 102. A vehicle inlet duct 106 provides air to the engine 10, and an exhaust duct 108 exhausts the thrust therefrom. The various components are shown in a particular configuration for clarity, however other configurations are possible in other embodiments such as, for example, in other single usage and reusable applications such as reconnaissance drones, cruise missiles, decoys and other weapon and non-weapon applications.

Figure 2:
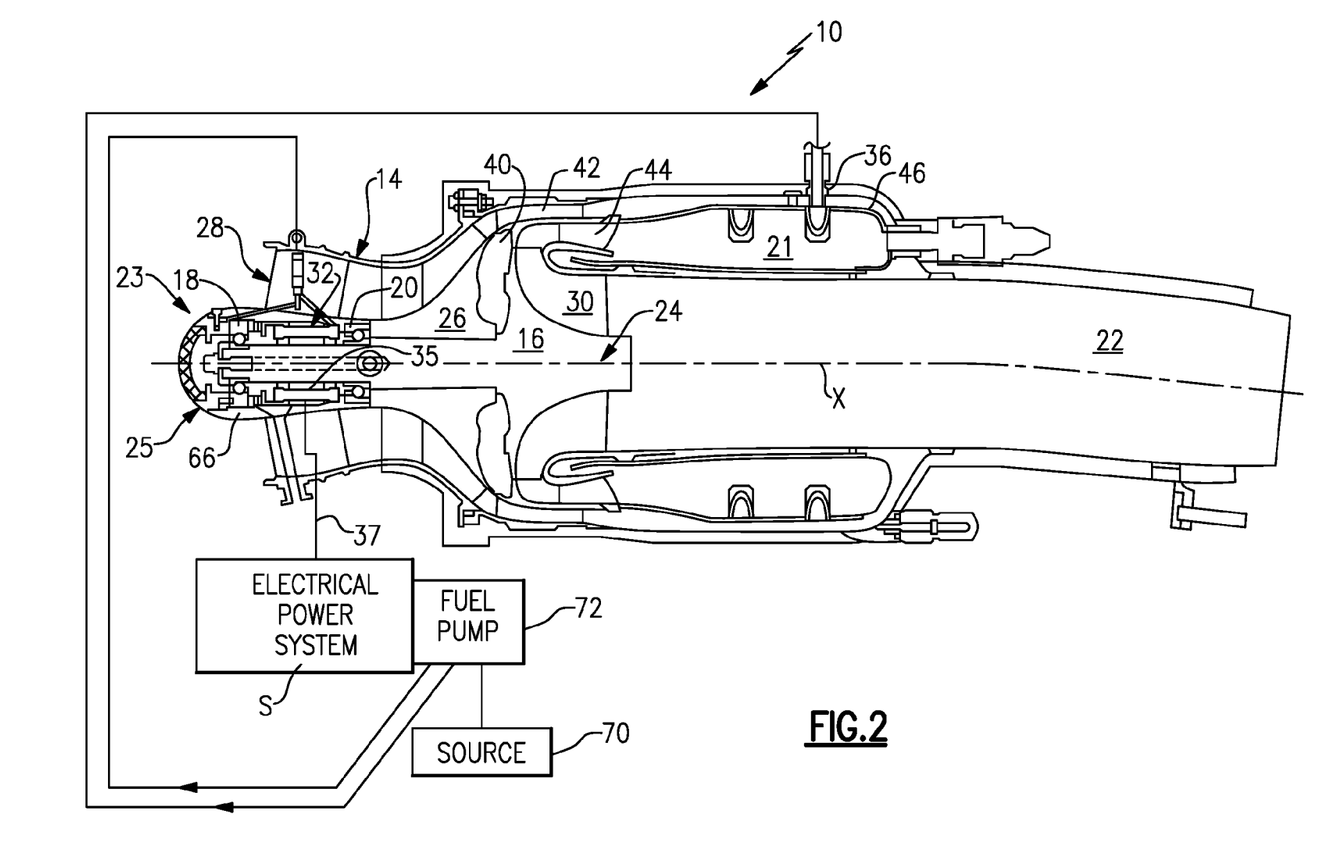
FIG. 2 is a cross-sectional schematic view of a gas turbine engine in an embodiment.

Referring to FIG. 2, the miniature gas turbine engine 10 generally includes a forward housing 14, a rotor shaft 16 rotationally mounted to a forward bearing 18 and an aft bearing 20, a combustion system 21 and an exhaust duct 22. The rotor shaft 16 rotates about a longitudinal axis X. The gas turbine engine also includes a nozzle plate 40, and a diffuser 42. It should be understood that other forms of rotating turbine machines, such as axial compressors and turbines, will also benefit from the present invention.

In the illustrated rotor configuration, a rotor system 24 includes a multiple of compressor blades facing forward toward an intake 28 to define a compressor wheel 26 and a multiple of turbine blades facing rearward toward the exhaust duct 22 to define a turbine wheel 30. The rotor shaft 16 is received in the bearings 18 and 20 and at least partially into an inlet cone 23 having a forward cover 25. In an embodiment, the forward cover 25 of the inlet cone 23 is the forward most portion of the engine 10 and defines an aerodynamically contoured shape which facilitates the delivery of undistorted, primary airflow to the intake 28.

In an embodiment, a permanent magnet generator (PMG) 32 is mounted to the rotor shaft 16 behind the forward bearing 18 to generate electrical power for the engine 10 and other accessories. The PMG 32 includes a stator 33 mounted within a forward housing inner support 66 of the forward housing 14 and a rotor 35 mounted to the rotor shaft 16. An electrical power wire 37 communicates electrical power from the PMG 32 to an electrical power system (illustrated schematically at S).

In an embodiment, a fuel pump (illustrated schematically at 72) is preferably driven by the electrical power system S to communicate fuel from a source 70 to an annular combustor liner 46 through a fuel manifold 36. The fuel is burned at high temperatures within the combustor liner 46 such that the expanding exhaust gases therefrom are communicated to the turbine wheel 30. The combustor liner 46 interfaces with the exhaust duct 22 such that exhaust gases from the combustor liner 46 are directed through a turbine blade assembly 44, through to the turbine wheel 30, through the exhaust duct 22 and exiting the exhaust duct 108 (see FIG. 1) of the vehicle for generating thrust.

A static structure generally includes the forward housing 14, the forward cover 25, the nozzle plate 40, the diffuser 42, the turbine blade assembly 44, a combustor liner 46, a combustor housing 48 and the exhaust duct 22. In an embodiment, each static structure component 14, 25, 40, 42, 44, 46, 48 and 22 is assembled together (FIG. 2) by one or more known techniques such as the relatively low cost fastening techniques of threaded fasteners, welding, v-band clamps, rivets, or the like. One of ordinary skill in the art in combination with the disclosure of the present application will readily determine the appropriate fastening technique for the particular component interface. It should also be understood that other static structure arrangements will also be usable with the present invention.

Figure 3:
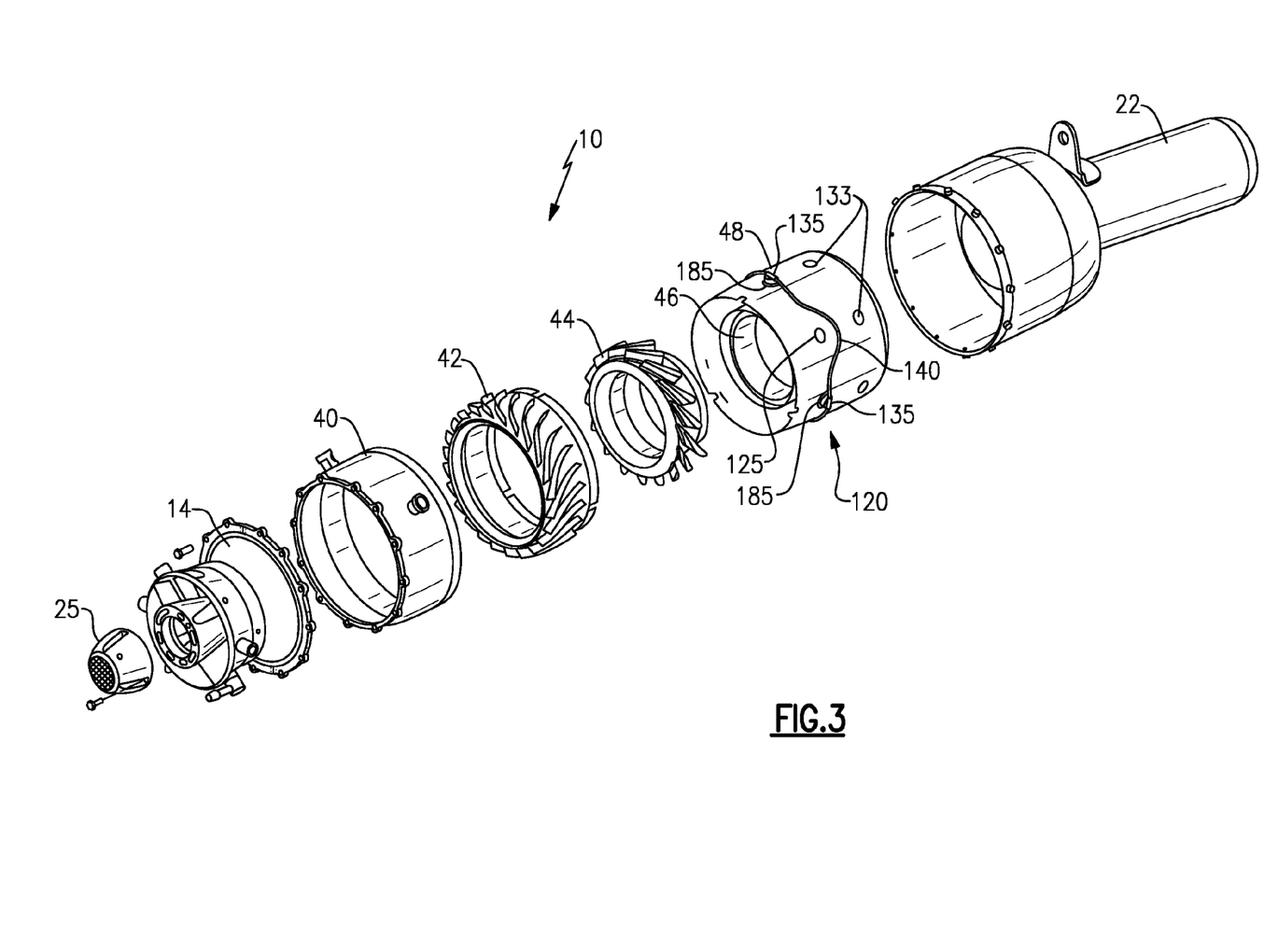
FIG. 3 is a perspective exploded view of the gas turbine engine static structure of FIG. 2 in an embodiment.

Referring now to FIG. 3, the combustor housing 48 (see FIG. 4) is shown in more detail. The combustor housing 48 has a first, forward annular row 120 of dilution holes 125 extending around the combustor housing 48 and a second, aft and annular row 130 of dilution holes 133 extending around the combustor housing 48 for admitting combustion air within the combustor housing 48. The forward row 120 is axially forward of the aft row 130.

Every other dilution hole 125 of the forward row 120 has a one-piece nozzle 135 disposed therein as will be discussed infra. Each one-piece nozzle is connected to an adjacent one-piece nozzle 135 by fuel line 140. The fuel line 140 has a first end portion 145, which is largely straight, a middle portion 150 attaching inboard to the first end portion 145, the middle portion having a u-shaped bend 152 to avoid interfering with air flowing into its associated dilution hole 125, and a second end portion 157, which is also largely straight, attaching at an inboard end thereof to the middle portion and at an outboard end to an adjacent one-piece nozzle 135. The fuel line 140 lies less than a width of the fuel line 140 from the combustor housing 48 and is flexible to adjust to movement in the engine 10.

Figure 4:
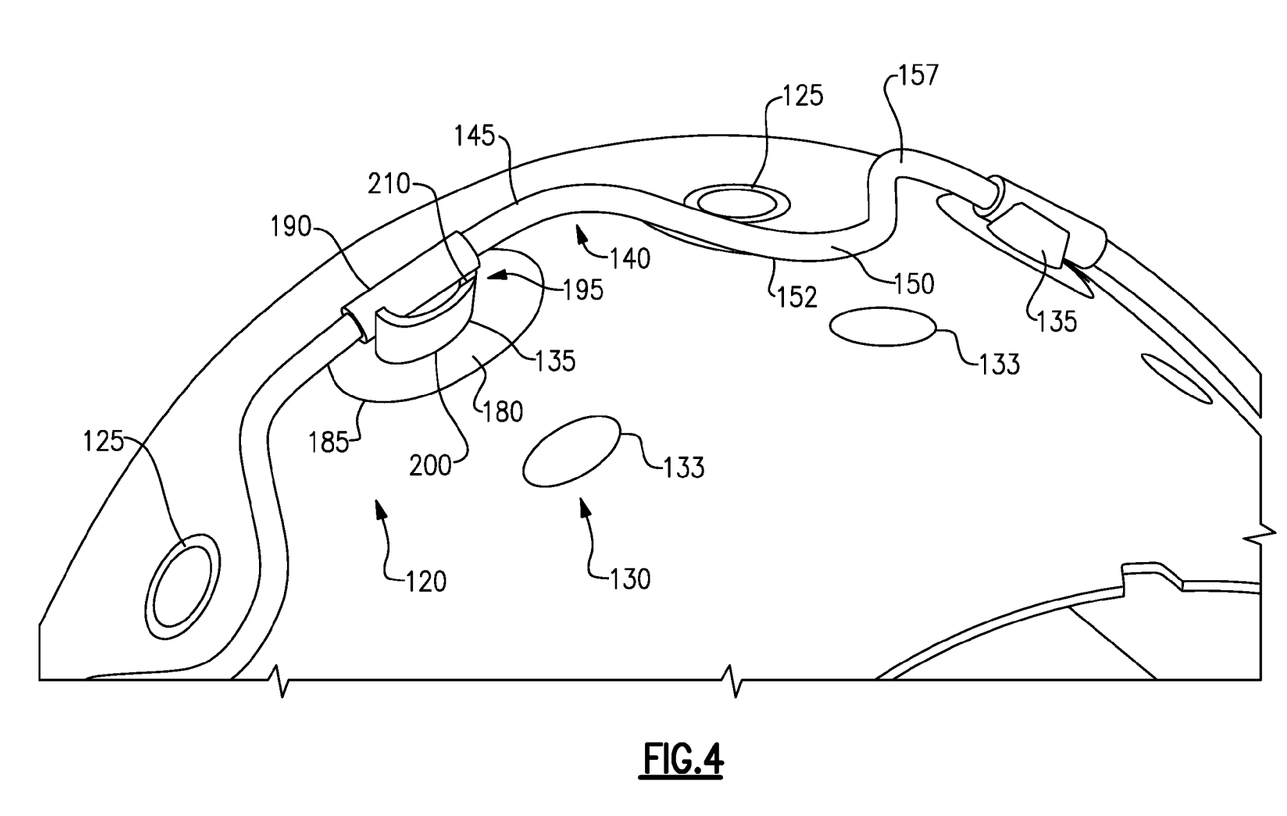
FIG. 4 is an expanded view of the combustor housing of FIG. 3 that incorporates a non-limiting embodiment described herein.
Figure 5:
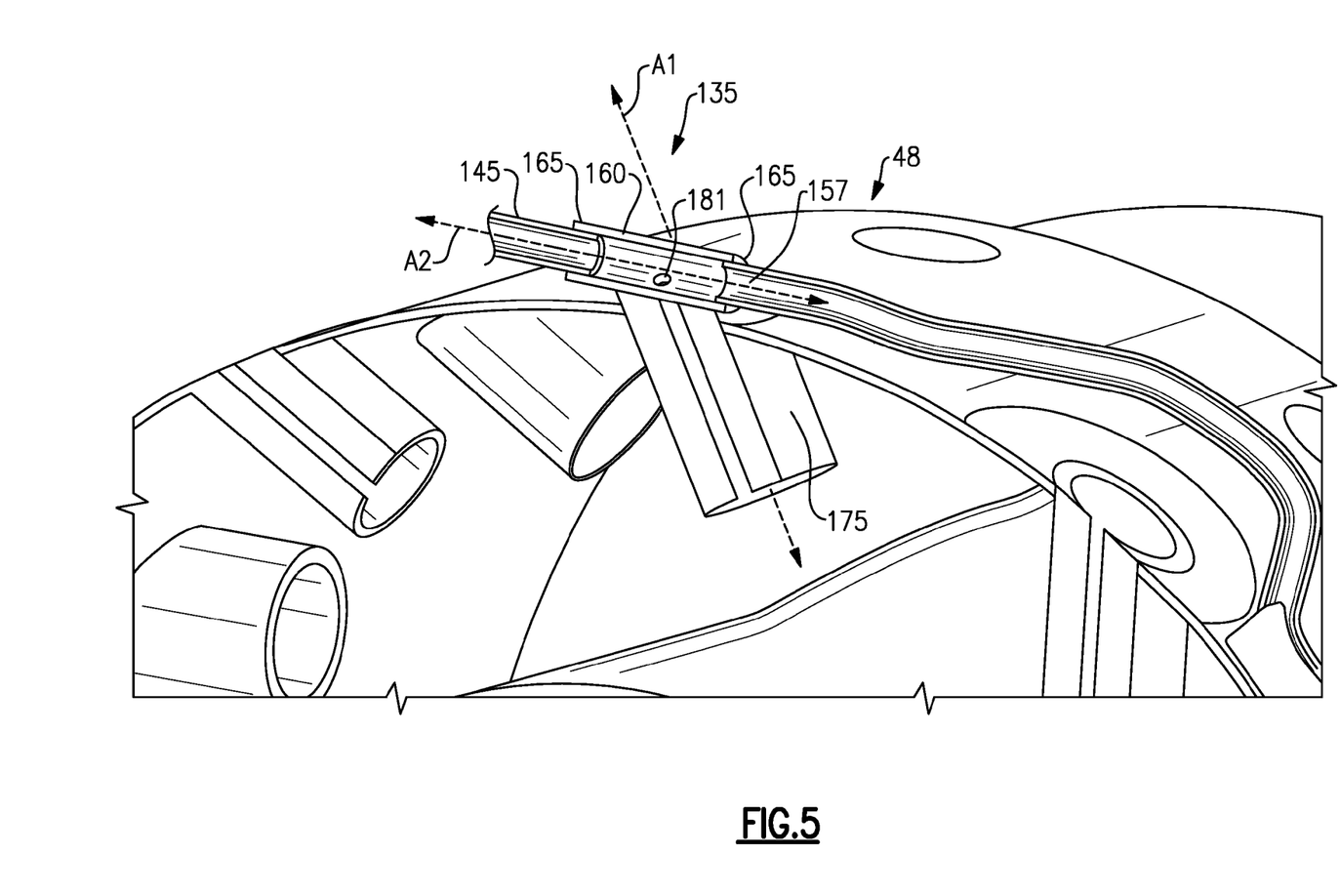
FIG. 5 is a cross-sectional expanded view taken along the line 5-5 of FIG. 4 in an embodiment.
Figure 6:
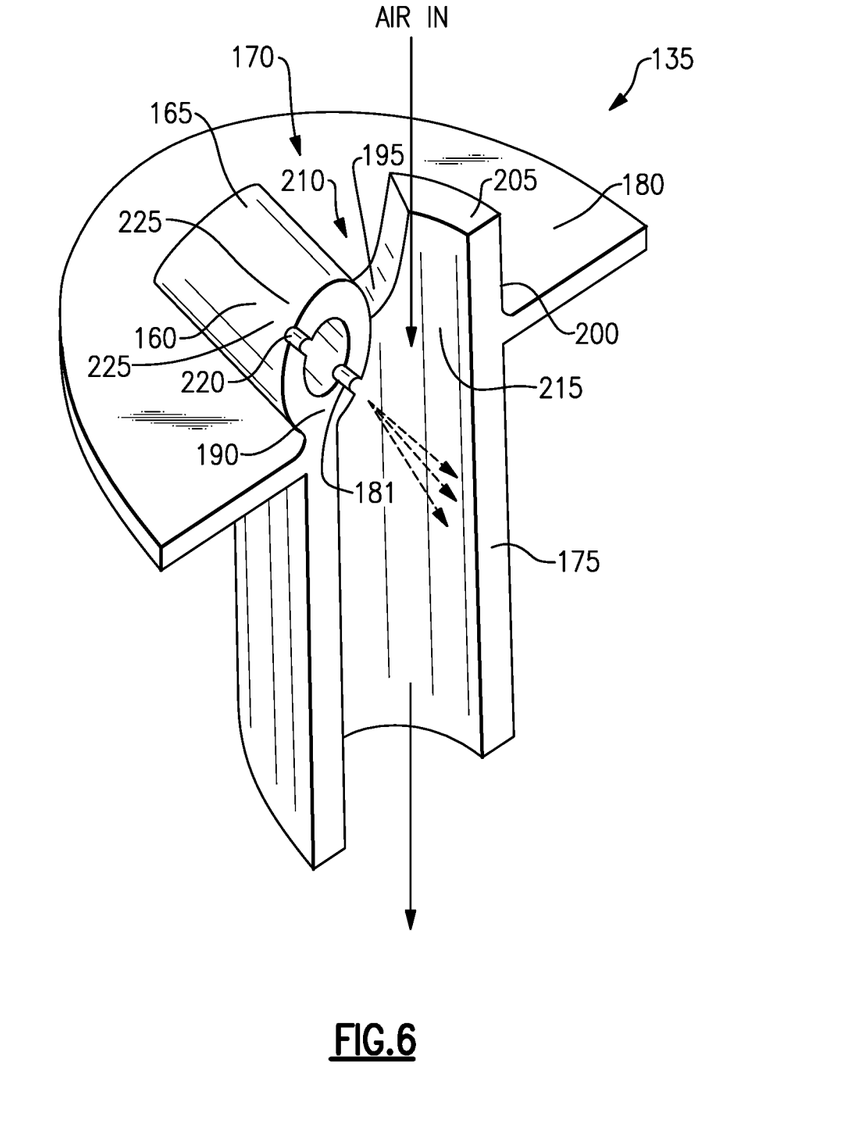
FIG. 6 is a partial cross-sectional expanded view taken along the line 5-5 of FIG. 4 in an embodiment.

Referring now to FIGS. 4-6, the one-piece nozzle 135 is described and has a fuel conduit 160 that attaches at either end 165 to a first end portion 145 or a second end portion 157, and includes a platform 170 atop which the fuel conduit 160 is disposed, and a mixing tube 175 that extends through the platform 170 at an oblique angle relative thereto and abuts the fuel conduit 160. The mixing tube 175, the platform 170, and the fuel conduit 160 are integrally formed by welding or the like, An opening 181 passes through the fuel conduit 160 in register with the mixing tube 175 such that the opening sprays fuel into the mixing tube for optimized atomization for combustion as will be discussed infra.

The platform 170 is generally a circular plate 180 that conforms to an annular shape of the combustor housing 48 of FIG. 3. An aperture 185 is machined into the combustor housing 48. The circular plate 180 is inserted and properly aligned in the aperture 185 to support circumferential combustion in the combustor housing 48. The circular plate 180 is then welded to the combustor housing 48 of FIG. 3.

The mixing tube 175 has a circular shape that is disposed in a center of the circular plate 180 and is canted to urge combustion circumferentially within the combustor housing 48. The fuel conduit 160 is integrally formed with a forward top portion 190 of the mixing tube 175. A central top portion 195 adjacent the fuel conduit 160 is open to admit air thereto, and an aft top portion 200 adjacent the central top portion 195 has a wall 205 that extends upwardly from the mixing tube 175 radially above the fuel conduit 160 and through the central top portion 195 to abut the mixing tube 175. A slot 210 is formed between the wall 205 and the fuel conduit 160 and aligns circumferentially with other one-piece nozzles disposed circumferentially about the combustor housing 48 in the first row 120. Air enters the mixing tube 175 through the slot 210, which creates turbulence in the mixing tube 175, over the wall 205 and through the mixing tube 175 again to optimize atomization of fuel entering through the opening 181 and air entering the mixing tube as described herein.

The opening 181 angles fuel spray radially inwardly within the mixing tube 175 from the forward position of the fuel conduit 160 towards an aft side 215 of the mixing tube 175. To construct the opening 181, an electrical discharge (not shown) is directed against the tube and essentially drills a passageway 220 through an outside surface 225 of the fuel conduit 160 that aligns with the opening 181 and then drills the opening 181, all in one pass. The passageway 220 is then closed by spot welding or the like.

By coupling the fuel conduit 160 to the platform and the mixing tube 175 and by precisely creating the opening 181, the fuel is directed to a proper area within every one-piece nozzle. If the spray is not directed to a proper area, there is risk that the fuel does not atomize properly thereby minimizing engine 10 efficiency or that the fuel could bounce out of the mixing tube 175. An embodiment minimizes error caused by aligning openings (not shown) in tubes (not shown) that are independent of the mixing tube 175. In an embodiment, the one-piece nozzle may be cast in one piece from a precision casting such that the plate 180, the mixing tube 175 and the fuel conduit 160 are integrally formed and are one-piece.

While the present invention has been described with reference to a particular preferred embodiment and by accompanying drawings, it would be understood by those in the art that the invention is not limited to the preferred embodiment and that various modification and the like could be made thereto without departing from the scope of the invention as defined in the following claims.

What is claimed is:

1. A nozzle for a jet engine, said nozzle comprising:
a mixing tube defining a first cylindrical passage that extends continuously radially outward from a centerline axis of the mixing tube;
a fuel conduit integrally formed with a first end of the mixing tube, the fuel conduit comprising a cylindrical wall defining a second cylindrical passage that extends continuously radially outward from a centerline axis of the fuel conduit and is separate from the first cylindrical passage, the first end of the mixing tube having a slot that extends through a wall of the mixing tube, the fuel conduit at least partially defining the slot; and
an opening in the cylindrical wall of the fuel conduit that defines a third passage that extends through the cylindrical wall, radially outward from the centerline axis of the fuel conduit, opens at a first end of the third passage into the first cylindrical passage, and opens at an opposite second end of the third passage into the second cylindrical passage.

2. The nozzle of claim 1 further comprising a plate integrally formed with said mixing tube, the fuel conduit situated on a first side of the plate, and a major portion of the mixing tube situated on an opposite second side of the plate.

3. The nozzle of claim 2 wherein said plate has a circular shape that conforms to a shape of an annulus that extends around the first cylindrical passage and is generally centered about the centerline axis of the mixing tube.

4. The nozzle of claim 1 wherein the fuel conduit is situated on a fore side of the first end of the mixing tube.

5. The nozzle of claim 1 wherein the first end of the mixing tube defines an arcuate wall that is disposed on an aft side of the first end of the mixing tube, the fuel conduit and arcuate wall situated on opposite sides of the centerline axis of the mixing tube at the first end of the mixing tube.

6. The nozzle of claim 5, wherein the arcuate wall extends longitudinally away from a second end of the mixing tube that is opposite the first end of the mixing tube, and extends circumferentially around only a partial circumference of the first cylindrical passage at the first end of the mixing tube.

7. The nozzle of claim 1 further comprising a passageway formed through the cylindrical wall of said fuel conduit and aligned with said opening such that said passageway and said opening may be formed in one operation, said passageway being sealed after formation of said opening.

8. A nozzle assembly for a jet engine, comprising:
a combustor housing;
a plurality of axially aligned nozzles that are axially aligned at a first axial position with respect to a central longitudinal axis of the combustor housing, each axially aligned nozzle comprising:
a mixing tube disposed in the combustor housing;
a fuel conduit integrally formed with said mixing tube and disposed outside of the combustor housing, wherein each fuel conduit is cylindrical and extends between opposing first and second ends of the fuel conduit; and
an opening intermediate of the opposing first and second ends of the fuel conduit that extends through a wall of said fuel conduit, said opening directed radially into said mixing tube; and
a plurality of fuel line segments, each fuel line segment extending between and fluidly connecting respective first and second ends of respective fuel conduits of respective adjacent axially aligned nozzles;
wherein each fuel line segment comprises terminal ends at the first axial position, and an intermediate portion that connects the terminal ends, the intermediate portion extending away from the first axial position of the terminal ends to a second axial position without crossing the first axial position, the second axial position being different than the first axial position; and
wherein the opposing first and second ends of each fuel conduit each comprise a respective opening that opens in a circumferential direction with respect to the central longitudinal axis of the combustor housing, each respective opening connected to a respective terminal end of a respective fuel line segment, each respective terminal end extending in the same circumferential direction as the respective opening to which the respective terminal end connects.

9. The nozzle assembly of claim 8 wherein each axially aligned nozzle also comprises a plate integrally formed with said mixing tube, the fuel conduit situated on a first side of the plate, and a major portion of the mixing tube situated on an opposite second side of the plate.

10. The nozzle assembly of claim 9 wherein said plate has a circular shape that conforms to a shape of said combustor housing.

11. The nozzle assembly of claim 8 wherein said combustor housing has a first annular row of dilution holes, and wherein a respective mixing tube of a respective axially aligned nozzle is disposed in every other dilution hole in the first annular row of dilution holes.

12. The nozzle assembly of claim 11:
wherein the combustor housing includes an additional, second annular row of dilution holes that are aft of and circumferentially aligned with the first annular row of dilution holes.

13. The nozzle assembly of claim 12 wherein the plate of each respective axially aligned nozzle conforms to a shape of the dilution hole into which the respective mixing tube of the respective axially aligned nozzle is inserted.

14. The nozzle assembly of claim 8 wherein the plurality of fuel line segments are flexible.

15. The nozzle of claim 1, wherein the centerline axis of the mixing tube is nonparallel, non-perpendicular, and non-intersecting with the centerline axis of the fuel conduit.

16. The nozzle of claim 1, wherein the centerline axis of the mixing tube extends through an opening at the first end of the mixing tube, and wherein the fuel conduit defines some but not all of a perimeter of the opening at the first end of the mixing tube.

17. The nozzle of claim 1, wherein the third passage is directed radially into the first cylindrical passage.

18. The nozzle assembly of claim 8, wherein the second axial position is aft of the first axial position.

19. The nozzle of claim 1, wherein the fuel conduit extends tangentially to the first end of the mixing tube.

20. The nozzle of claim 1, wherein the first cylindrical passage tapers at the first end of the mixing tube due to encroachment of the fuel conduit.

21. The nozzle of claim 1, wherein the third passage opens into the first cylindrical passage at an oblique angle with respect to the first cylindrical passage.

* * * * *